(12) United States Patent
Yagi et al.

(10) Patent No.: US 9,251,932 B2
(45) Date of Patent: Feb. 2, 2016

(54) TERMINAL CONNECTING PART OF SUPERCONDUCTING CABLE

(75) Inventors: Masashi Yagi, Tokyo (JP); Takaharu Mitsuhashi, Tokyo (JP); Tomoya Nomura, Tokyo (JP); Shinichi Mukoyama, Tokyo (JP); Hirao Hirata, Tokyo (JP); Tokui Yonemura, Chiba (JP); Shuka Yonemura, legal representative, Chiba (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 237 days.

(21) Appl. No.: 13/816,606

(22) PCT Filed: Jan. 26, 2012

(86) PCT No.: PCT/JP2012/051656
§ 371 (c)(1),
(2), (4) Date: Sep. 27, 2013

(87) PCT Pub. No.: WO2012/102340
PCT Pub. Date: Aug. 2, 2012

(65) Prior Publication Data
US 2014/0027141 A1     Jan. 30, 2014

(30) Foreign Application Priority Data

Jan. 27, 2011  (JP) ................................ 2011-014656
Jan. 27, 2011  (JP) ................................ 2011-014657

(51) Int. Cl.
*H01B 12/16*     (2006.01)
*H01R 4/68*      (2006.01)
*H02G 15/34*     (2006.01)

(52) U.S. Cl.
CPC .................. *H01B 12/16* (2013.01); *H01R 4/68* (2013.01); *H02G 15/34* (2013.01); *Y02E 40/648* (2013.01)

(58) Field of Classification Search
CPC ........................................................ H01B 12/16
USPC .................................................. 174/15.5, 155
See application file for complete search history.

(56) References Cited

U.S. PATENT DOCUMENTS 3,758,701 A * 9/1973  Schmidt ........................... 174/28
7,605,329 B2 * 10/2009 Schmidt et al. .............. 174/15.4
(Continued)

FOREIGN PATENT DOCUMENTS

| CN | 1722557 A | 1/2006 |
| JP | 8 196029  | 7/1996 |

(Continued)

OTHER PUBLICATIONS

Office Action issued Sep. 2, 2015 in Chinese Patent Application No. 201280002017.X (with English language translation).
(Continued)

*Primary Examiner* — Timothy Thompson
*Assistant Examiner* — Charles Pizzuto
(74) *Attorney, Agent, or Firm* — Oblon, McClelland, Maier & Neustadt, L.L.P.

(57) ABSTRACT

A terminal connecting part has: a low temperature container filled with a cooling medium; a conductor current lead which has one end immersed in the cooling medium and the other end led to a normal temperature part; and a conductor movable connecting terminal which electrically connects a superconductive conductor layer and the conductor current lead of a superconducting cable. The superconductive conductor layer of the superconducting cable stripped stepwise from a front end is connected to the conductor current lead through the conductor movable connecting terminal. The cable core of the superconducting cable is movable in a longitudinal direction and is rotatable in a circumferential direction while maintaining electrical connection between the superconductive conductor layer and the conductor current lead. The cable core is horizontally supported in the low temperature container.

8 Claims, 13 Drawing Sheets

(56) References Cited

U.S. PATENT DOCUMENTS

| | | | |
|---|---|---|---|
| 8,091,207 B2 * | 1/2012 | Soika et al. ................ | 29/599 |
| 2005/0217878 A1 * | 10/2005 | Ashibe et al. ............... | 174/15.5 |
| 2006/0011377 A1 | 1/2006 | Schmidt et al. | |

FOREIGN PATENT DOCUMENTS

| JP | 3181490 | 7/2001 |
|---|---|---|
| JP | 2006 34087 | 2/2006 |
| JP | 2006 216507 | 8/2006 |
| JP | 2007 66819 | 3/2007 |
| JP | 2008 204635 | 9/2008 |
| JP | 2009 140912 | 6/2009 |
| JP | 4550699 | 9/2010 |
| WO | WO 02/15203 A1 | 2/2002 |

OTHER PUBLICATIONS

Office Action issued Sep. 29, 2015 in Japanese Patent Application No. 2012-554836 (with English language translation).

International Search Report Issued Feb. 28, 2012 in PCT/JP12/051656 Filed Jan. 26, 2012.

Combined Chinese Office Action and Search Report issued Feb. 2, 2015 in Patent Application No. 201280002017.X (with English language translation and English translation of categories of cited documents).

* cited by examiner

TERMINAL CONNECTING PART OF SUPERCONDUCTING CABLE

TECHNICAL FIELD

The present invention relates to a terminal connecting part of a superconducting cable in which a cable core having a former and a superconductive conductor layer is housed in a thermal insulation tube.

BACKGROUND ART

Conventionally, there has been a known superconducting cable using a superconducting wire that can be in a superconducting state at cryogenic temperatures as a conductor. A superconducting cable is expected as a power cable capable of transmitting a large current with low loss, and has been developed for the practical use.

An example of a superconducting cable is illustrated in FIG. 2. A superconducting cable 10 illustrated in FIG. 2 is a single-core superconducting cable, in which a cable core 11 as the single core is housed in a thermal insulation tube 12.

The cable core 11 is composed of a former 111, superconductive conductor layers 112, an electric insulating layer 113, superconducting shield layers 114, a normal conducting shield layer 115, a protecting layer 116, and the like. The superconductive conductor layers 112 are formed by winding a plurality of superconducting wire materials spirally on the former 111. Similarly, the superconducting shield layers 114 are formed by winding a plurality of superconducting wire materials spirally on the electric insulating layer 113.

Each of superconducting wire materials for forming the layers 112 and the superconducting shield layers 114 has a laminated structure obtained by forming an intermediate layer, a superconducting layer, a protecting layer in this order on a tape-shaped metal substrate, for example. As a superconductor for forming the superconducting layer may be a RE-based superconductor (RE: rare earth element) showing superconductivity at a liquid nitrogen temperature (−196° C. in the atmospheric pressure) or more, for example. An yttrium-based superconductor (Y-based superconductor, hereinafter) expressed as the chemical formula $YBa_2Cu_3O_{7-y}$ is especially typical.

The thermal insulation tube 12 has a double tube structure constituted of an internal tube 121 and an external tube 122. Between the internal tube 121 and the external tube 122, a multilayer thermal insulator (Super Insulation) 123 is interposed and vacuumed. In addition, the outer periphery of the external tube 122 is covered by a corrosion-resistant layer 124 of polyvinyl chloride (PVC), polyethylene, or the like.

During a steady operation of the superconducting cable 10, a cooling medium such as liquid nitrogen is circulated inside the internal tube 121, and thus transmitted electric current flows into the superconductive conductor layers 112 at a very low temperature.

At such a portion at which the superconducting cable 10 and a practical system such as a power device are connected, terminal processing is applied using a terminal connecting part. In the terminal connecting part, an end of the superconducting cable 10 is housed in a low temperature container which serves as a low temperature part, and is connected to the practical system which serves as a normal temperature part through a current lead.

The superconducting cable 10 is cooled from the normal temperature to a liquid nitrogen temperature or is heated from the liquid nitrogen temperature to the normal temperature upon assembly or maintenance. It is known that, under such a heat cycle, the cable core 11 thermally expands and contracts at about 0.3% of the length of the superconducting cable.

In the terminal connecting part, when the cable core 11 is connected to the current lead and has difficulty in moving in a longitudinal direction, when the cable core 11 thermally expands and contracts, a local stress applies to the superconducting cable 10. Further, buckling occurs in superconducting wire materials forming the superconductive conductor layers 112 and the superconducting shield layers 114, and performance of the superconducting cable 10 significantly decreases.

Hence, Patent Literature 1 discloses absorbing thermal expansion and contraction by connecting superconductive conductor layers and current leads using connecting terminals such as braided wires having flexibility (flexible connecting terminal). Further, a technique has been proposed which absorbs thermal expansion and contraction of a cable core by providing an offset to a superconducting cable in a terminal connecting part or allowing the terminal connecting part to slide in the longitudinal direction of the superconducting cable.

A terminal device of another conventional superconducting cable prevents occurrence of a local stress of a superconducting cable due to thermal expansion and contraction by providing a rail which allows a low temperature container which houses a terminal of the superconducting cable to move along an extension line of the superconducting cable and a driving motor which moves the low temperature container along the rail, and controlling movement of the low temperature container according to thermal expansion and contraction of the superconducting cable (see, for example, Patent Literature 2).

Still further, the terminal device of another superconducting cable absorbs thermal expansion and contraction by connecting superconductive conductor layers and current leads using connecting terminals such as braided wires having flexibility (flexible connecting terminal) (see, for example, Patent Literature 3).

Moreover, a terminal device of still another superconducting cable absorbs thermal expansion and contraction of a lead conductor by vertically dividing the lead conductor which is connected to a terminal of the superconductive conductor of the superconducting power transmission cable through a virtually L-shaped flexible conductor and which is led in a vertical direction, and forming a socket in a coupling part of one of the two divided lead conductors and allowing the other coupling part to be inserted in the socket along the vertical direction and to slide inside the socket (see, for example, Patent Literature 4).

PRIOR ART DOCUMENTS

Patent Literature

Patent Literature 1: JP 2009-140912 A
Patent Literature 2: JP Patent No. 3181490
Patent Literature 3: JP 2009-140912 A
Patent Literature 4: JP Patent No. 4550699

SUMMARY OF THE INVENTION

Problem to be Solved by the Invention

However, according to a method disclosed in Patent Literature 1 of connecting superconductive conductor layers and current leads using flexible connecting terminals, the amount of thermal expansion and contraction which can be absorbed is small and, when the cable core is twisted, the flexible connecting terminal is also twisted, and therefore it is not possible to effectively relax concentration of a local stress on the superconducting cable.

According to the method of providing an offset to the superconducting cable in the terminal connecting part, it is necessary to provide a great offset to sufficiently absorb thermal expansion and contraction and therefore the terminal connecting part becomes significantly large.

According to the method of making the terminal connecting part movable, a problem occurs in connection with other devices and, in addition, a large axial force is required to move the superconducting cable, and therefore it is not possible to avoid concentration of a local stress on the superconducting cable. Further, a mechanism of sliding the terminal connecting part or a device of measuring the amount of thermal expansion and contraction of the cable core is required, and therefore a structure of the terminal connecting part becomes complicated.

Furthermore, the terminal devices disclosed in Patent Literatures 1 and 2 only apply a countermeasure to thermal expansion and contraction occurring in the terminals of the superconductive conductors, and cannot handle thermal expansion and contraction occurring in lead conductors connected to the superconductive conductors and extending vertically upward.

Meanwhile, although the terminal device disclosed in Patent Literature 3 employs a configuration of connecting superconductive conductor layers and current leads using connecting terminals such as braided wires having flexibility and can allow greater flexibility as to thermal expansion and contraction in the vertical direction, when a current flowing in the superconducting cable becomes significant, it is necessary to increase the number of conductive wires forming the braided wires or use conductive wires of larger diameters and, therefore, there is a problem that flexibility of the braided wires decreases and it is not possible to sufficiently handle thermal expansion and contraction in the vertical direction. Further, the braided wire is requested to handle thermal expansion and contraction in the horizontal direction due to the superconductive conductor and thermal expansion and contraction in the vertical direction of the lead conductor, and it is difficult to simultaneously handle thermal expansion and contraction occurring in these two directions in a satisfying manner.

Furthermore, the terminal device disclosed in Patent Literature 4 couples the superconductive conductor and the lead conductor through the virtually L-shaped flexible conductor, and therefore, when a current flowing in the superconducting cable becomes large, it is necessary to use a flexible conductor of a larger cross-sectional area and there is a problem that flexibility of the flexible conductor decreases and it is not possible to sufficiently handle thermal expansion and contraction in the vertical direction.

Still further, an insulating coat is formed on the surface of the lead conductor of the terminal device, and therefore there is a concern that a difference in the amount of thermal expansion and contraction is produced between the lead conductor and the insulating coat and a stress may be produced in, for example, cooling process or heating process upon assembly or maintenance, and peeling or destruction may occur.

The present invention is made to solve the above problem, and an object of the present invention is to provide a terminal connecting part of a superconducting cable which is capable of maintaining integrity of the superconducting cable by absorbing, for example, thermal expansion and contraction of a cable core under a heat cycle and being downsized and simplified.

It is another object of the present invention to provide a terminal connecting part of the superconducting cable which is capable of effectively allowing thermal expansion and contraction occurring in a direction in which a conductor is led out from a superconductive conductor.

Means to Solve the Problem

An invention according to a first aspect of the present invention is a terminal connecting part of a superconducting cable in which a cable core including a former and a superconductive conductor layer is housed in a thermal insulation tube. The terminal connecting part includes a low temperature container which is filled with a cooling medium, a conductor current lead, one end of the current lead is immersed in the cooling medium and an other end is led to a normal temperature part, and a conductor movable connecting terminal which electrically connects the superconductive conductor layer and the conductor current lead. The superconductive conductor layer of the superconducting cable which is stripped stepwise from a front end is connected to the conductor current lead through the conductor movable connecting terminal. The cable core of the superconducting cable is movable in a longitudinal direction and is rotatable in a circumferential direction while maintaining electrical connection between the superconductive conductor layer and the conductor current lead.

The conductor movable connecting terminal is connected to the conductor current lead provided to hang down from above the low temperature container. And the cable core is horizontally supported by a connecting part with the conductor movable connecting terminal and a connecting part between the thermal insulation tube and the low temperature container.

With an invention according to a second aspect of the present invention, in the terminal connecting part of the superconducting cable according to the first aspect of the present invention, the conductor movable connecting terminal is composed of a conductor plug which is attached to an outer periphery of the superconductive conductor layer and a conductor socket to which the conductor plug is movably attached, and the conductor plug is inserted, in a state being attached to the outer periphery of the superconductive conductor layer, in the conductor socket connected to the conductor current lead.

At least two conductive contacting terminals are interposed between the conductor plug and the conductor socket.

With an invention according to a third aspect of the present invention, in the terminal connecting part of the superconducting cable according to the first or second aspect of the present invention, the cable core includes a superconducting shield layer, a normal conducting shield layer and a shield movable connecting terminal which electrically connects the superconducting shield layer and the shield current lead, and the terminal connecting part includes a shield current lead, one end of the shield current lead is immersed in the cooling medium and an other end is led to a normal temperature part. The superconducting shield layer of the superconducting cable which is stripped stepwise is connected to the shield current lead through the shield movable connecting terminal. The cable core of the superconducting cable is movable in the longitudinal direction and is rotatable in the circumferential direction while also maintaining electrical connection between the superconducting shield layer and the shield current lead.

The shield movable connecting terminal is connected to the shield current lead provided to hang down from above the low temperature container, and the cable core is horizontally supported by a connecting part with the conductor movable connecting terminal, a connecting part with the shield movable connecting terminal and a connecting part between the thermal insulation tube and the low temperature container.

With an invention according to a fourth aspect of the present invention, in the terminal connecting part of the superconducting cable according to the third aspect of the present invention, the shield movable connecting terminal is composed of a shield plug which is attached to an outer periphery of the superconducting shield layer and a shield socket to which the shield plug is movably attached, and the shield plug is inserted, in a state being attached to the outer periphery of the superconducting shield layer, in the shield socket connected to the shield current lead.

At least two conductive contacting terminals are interposed between the shield plug and the shield socket.

With an invention according to a fifth aspect of the present invention, in the terminal connecting part of the superconducting cable according to any one of the first to fourth aspects of the present invention, levelness of the superconducting cable core is defined by an amount of deflection, and the amount of deflection is maintained at 1 mm or less.

With an invention according to a sixth aspect of the present invention, in the terminal connecting part of the superconducting cable according to any one of the first to fifth aspects of the present invention, the conductor current lead includes an upper lead, and a lower lead which are vertically coupled. The low temperature container supports the lower lead to vertically hang down through an insulating tubular body which surrounds the lower lead with a gap around the lower lead, and a coupling part between the upper lead and the lower lead and a coupling part between the lower lead and the conductor movable connecting terminal are slidable with respect to each other along a longitudinal direction of the conductor current lead while maintaining an electrically connected state.

With an invention according to a seventh aspect of the present invention, in the terminal connecting part of the superconducting cable according to the sixth aspect of the present invention, each of the coupling part between the upper lead and the lower lead and the coupling part between the lower lead and the conductor movable connecting terminal adopts a structure in which at least two conductive contacting terminals are interposed, and which allows a turn about a center line along the longitudinal direction of the conductor current lead.

With an invention according to an eighth aspect of the present invention, in the terminal connecting part of the superconducting cable according to the second, fourth or seventh aspect of the present invention, the conductive contacting terminals are formed with coil springs.

Advantageous Effects of the Invention

According to the present invention, a cable core can smoothly move in a longitudinal direction, so that it is possible to effectively absorb thermal expansion and contraction of the cable core occurring in cooling process or heating process upon assembly or maintenance. Further, the cable core is rotatable in a circumferential direction, so that it is also possible to absorb a twist to be applied to the cable core due to a residual stress when the superconducting cable is manufactured or laid.

Consequently, since a local stress does not concentrate following thermal expansion and contraction or a twist of the cable core and the superconductive conductor layers or the superconducting shield layers do not buckle, it is possible to maintain integrity of the superconducting cable.

Further, since the cable core and the current lead can be connected using a simple member which is a movable connecting terminal, it is possible to simplify and downsize the terminal connecting part.

Furthermore, in a case where a conductor current lead is divided into an upper lead and a lower lead, a low temperature container supports the lower lead to hang down through an insulating tubular body which has a gap with respect to the lower lead, and both of a coupling part between the upper lead and the lower lead and a coupling part between the lower lead and the conductor movable connecting terminal are slidable with respect to each other along the longitudinal direction of the conductor current lead, the following effect is provided.

That is, since the insulating tubular body has a gap with respect to the lower lead, when the conductor current lead and the insulating tubular body are thermally expanded and contracted in, for example, cooling process or heating process upon assembly or maintenance, it is possible to effectively prevent peeling or destruction due to the difference in the amount of subsequent expansion and contraction.

Meanwhile, the lower lead is supported in the low temperature container through the insulating tubular body and therefore, when a gap is provided between the insulating tubular body and the lower lead, the lower lead is influenced by positional fluctuation due to thermal expansion and contraction of the insulating tubular body and influenced by thermal expansion and contraction of the lower lead itself. However, a connecting part which couples the lower lead slidably with respect to the upper lead and a coupling part which couples the lower lead slidably with respect to the conductor movable connecting terminal are provided, so that it is possible to absorb the influence of positional fluctuation due to thermal expansion and contraction of the insulating tubular body by way of sliding at one coupling part and absorb the influence due to thermal expansion and contraction of the lower lead itself by way of sliding at the other coupling part.

Consequently, the present invention can effectively prevent occurrence of a stress with respect to the lower lead while effectively preventing peeling and destruction of an insulator of the lower lead.

DESCRIPTION OF EMBODIMENTS TO CARRY OUT THE INVENTION

[First Embodiment]

Hereinafter, a first embodiment of the present invention will be described in detail based on the attached drawings.

Figure 1:
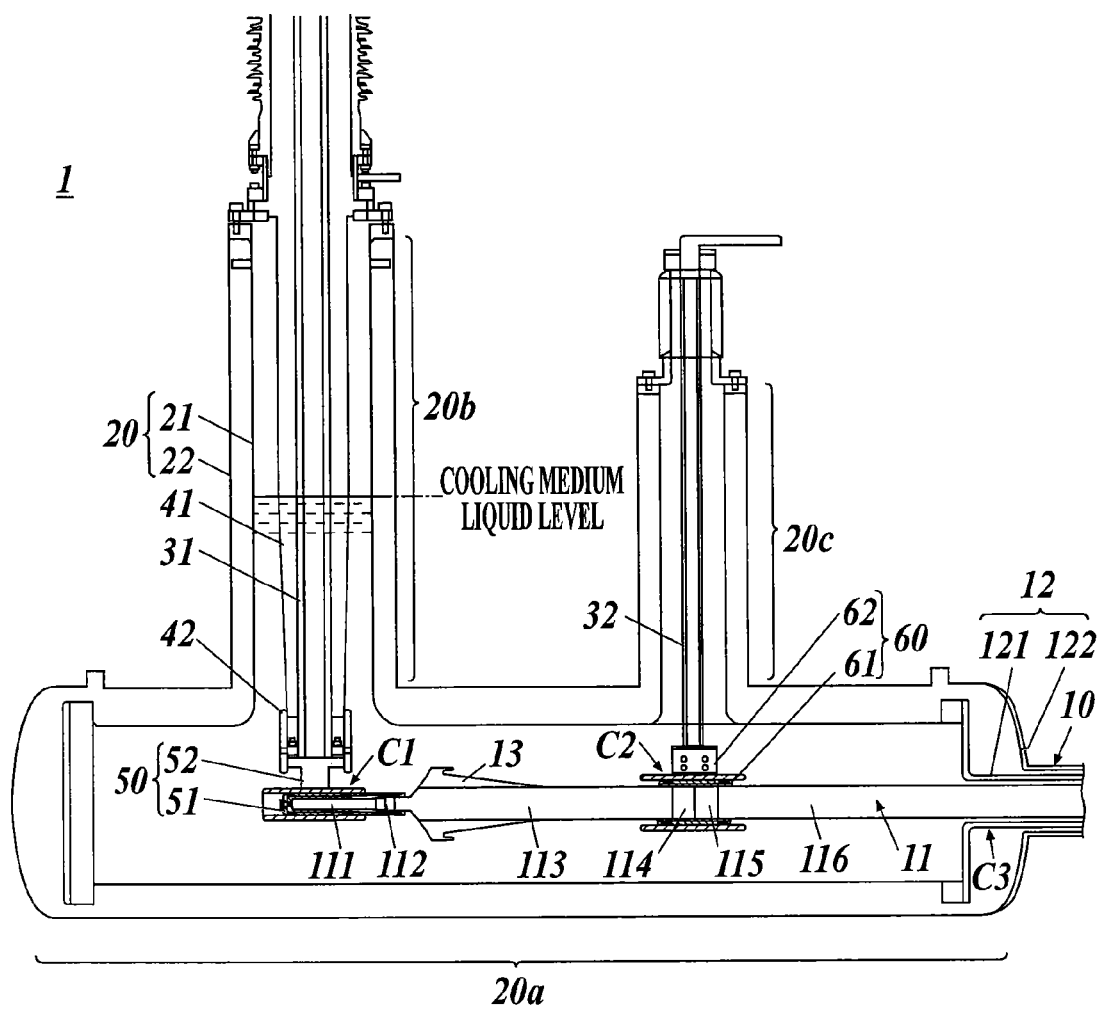
FIG. 1 is a view illustrating a schematic configuration of a terminal connecting part of a superconducting cable according to a first embodiment.
Figure 2:
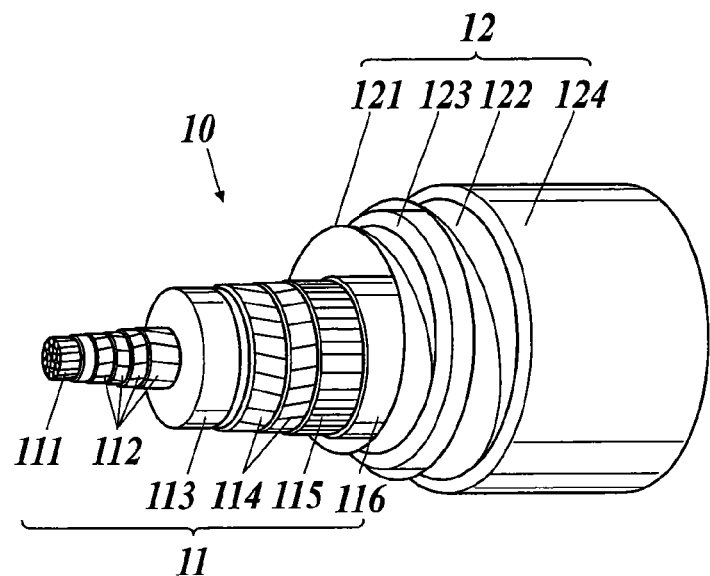
FIG. 2 is a view illustrating an example of the superconducting cable in which the terminal connecting part is formed.

FIG. 1 is a view illustrating a schematic configuration of a terminal connecting part of a superconducting cable according to the first embodiment, and FIG. 2 is a view illustrating an example of the superconducting cable in which the terminal connecting part is formed.

A superconducting cable 10 illustrated in FIG. 2 is a single-core superconducting cable, in which a cable core 11 as the single core is housed in a thermal insulation tube 12. The cable core 11 is composed of a former 111, superconductive conductor layers 112, an electric insulating layer 113, superconducting shield layers 114, a normal conducting shield layer 115, a protecting layer 116, and the like.

The former 111 is a core for winding to form the cable core 11, and may be structured by twisting normal conducting wire materials such as copper wires, for example, together. Into the former 111, fault current flowing through the superconductive conductor layers 112 upon short circuit is branched.

The superconductive conductor layers 112 are formed by winding a plurality of superconducting wire materials spirally on the former 111. In FIG. 2, the superconductive conductor layers 112 have a laminated structure of four layers. Through the superconductive conductor layers 112, transmitted electric current flows during a steady operation.

Each of superconducting wire materials for forming the superconductive conductor layers 112 has a laminated structure obtained by forming an intermediate layer, a superconducting layer, a protecting layer in this order on a tape-shaped metal substrate, for example. As a superconductor for forming the superconducting layer, a RE-based superconductor (RE: rare earth element) showing superconductivity at a liquid nitrogen temperature or more can be used. An example of such RE-based superconductor may be a Y-based superconductor expressed as the chemical formula $YBa_2Cu_3O_{7-y}$. In addition, a tape-shaped superconducting wire, in which a superconductor is formed in a metal matrix may be used. As a superconductor, a bismuth-based superconductor expressed by the chemical formula $Bi_2Sr_2CaCu_2O_{8+\delta}$ (Bi2212), or $Bi_2Sr_2Ca_2Cu_3O_{10+\delta}$ (Bi2223) can be used. In the chemical formula, $\delta$ indicates a nonstoichiometric amount of oxygen.

The electric insulating layer 113 is made of an insulating paper, a semi-synthesized paper obtained by joining an insulating paper and a polypropylene film, a polymer non-woven tape, or the like, for example and is formed by winding it on the superconductive conductor layers 112.

The superconducting shield layers 114 are formed by winding a plurality of superconducting wire materials spirally on the electric insulating layer 113. In FIG. 2, the superconducting shield layers 114 have a laminated structure of two layers. Substantially the same current as conductor current flows through the superconducting shield layers 114 in opposite phase by an electromagnetic induction during a steady operation. As the superconducting wire materials for forming the superconducting shield layers 114, superconducting wire materials similar to those for the superconductive conductor layers 112 may be used.

The normal conducting shield layer 115 is formed by winding a normal conducting wire such as a copper wire on the superconducting shield layers 114. Fault current flowing through the superconducting shield layers 114 upon short circuit is branched into the normal conducting shield layer 115.

The protecting layer 116 is made of an insulating paper, a polymer non-woven fabric, or the like, for example and is formed by winding it on the normal conducting shield layer 115.

The thermal insulation tube 12 has a double tube structure constituted of an internal tube 121 in which the cable core 11 is housed and which is filled with a cooling medium (liquid nitrogen, for example) and an external tube 122 which is provided so as to cover the outer periphery of the internal tube 121.

The internal tube 121 and the external tube 122 are, for example, stainless steel corrugated tubes. Between the internal tube 121 and the external tube 122, a multilayer thermal insulator (Super Insulation) 123 formed by a laminated body of polyethylene films on which aluminum is deposited, for example, is interposed, and a region therebetween is maintained in a vacuum state. In addition, the outer periphery of the external tube 122 is covered by a corrosion-resistant layer 124 of polyethylene, or the like.

As illustrated in FIG. 1, a terminal connecting part 1 employs a configuration in which an end of a superconducting cable 10 is housed in a low temperature container 20 in a predetermined state and a current is led to a practical system side through a conductor current lead 31 and a shield current lead 32.

In the terminal connecting part 1, the superconductive conductor layers 112 and the conductor current lead 31 of the superconducting cable 10 are electrically connected through a conductor movable connecting terminal 50 (conductor connecting part C1). The conductor movable connecting terminal 50 is a terminal for connecting the cable core 11 to the conductor current lead 31 in a state where the cable core 11 is movable in the longitudinal direction and is rotatable in the circumferential direction.

Further, the superconducting shield layers 114 and the shield current lead 32 of the superconducting cable 10 are electrically connected through a shield movable connecting terminal 60 (shield connecting part C2). The shield movable connecting terminal 60 is a terminal for connecting the cable core 11 to the shield current lead 32 in a state where the cable core 11 is movable in the longitudinal direction and is rotatable in the circumferential direction.

That is, in the terminal connecting part 1, the cable core 11 is supported by the conductor connecting part C1 and the shield connecting part C2, and is movable in the longitudinal direction and is rotatable in the circumferential direction.

The low temperature container 20 adopts a double-structure formed with an inner cooling medium tank 21 and an outer vacuum tank 22, and is partitioned into an accommodating part 20a which houses the end of the superconducting cable 10 and cylindrical lead parts 20b and 20c which are vertically provided to the accommodating part 20a. Further, in the low temperature container 20 (the cooling medium tank 21 and the vacuum tank 22), a hand hole (not illustrated) which can be sealed airtight is formed such that an operator can work from an outside upon working.

The conductor current lead 31 and the shield current lead 32 are conductors for leading currents from the superconducting cable 10 to the practical system, and is formed using, for example, a copper tube material. The conductor current lead 31 is provided being hanged down in the lead part 20b of the low temperature container 20, and the shield current lead 32 is provided being hanged down in the lead part 20c In addition, the conductor current lead 31 and the shield current lead 32 may be formed using conductive tubes or solid wires.

In the outer periphery of the conductor current lead 31, a bushing 41 made of, for example, fiber reinforced plastics (FRP) is provided, and, at a lower end of the conductor current lead 31 (a connecting part with the conductor movable connecting terminal 50), an electrode shield 42 is provided. That is, a high voltage is applied to the conductor current lead 31 and therefore, an electric field with respect to the low temperature container 20 to be earthed is relaxed by providing the bushing 41 and the electrode shield 42.

In the outer periphery of the electric insulating layer 113 of the cable core 11 positioned between the conductor connecting part C1 and the shield connecting part C2, an electric field relaxing layer 13 formed with an epoxy bellmouth and a stress cone is formed. The end of the superconducting cable 10 is put in the accommodating part 20a of the low temperature container 20 and is immersed in a cooling medium (for example, liquid nitrogen). In this case, the internal tube 121 of the superconducting cable 10 is connected to an outer wall of the cooling medium tank 21, and the external tube 122 is connected to an outer wall of the vacuum tank 22 (cable connecting part C3). The internal tube 121 and the cooling medium tank 21, and the external tube 122 and the vacuum tank 22 are connected by way of, for example, welding or bolting.

During the steady operation, a cooling medium is circulated in and supplied to an interior of the internal tube 121 of the superconducting cable 10 and the cooling medium tank 21 communicating to the inside of the internal tube 121 by a cooling medium circulating device (not illustrated). Further, a gap between the internal tube 121 and the external tube 122 of the superconducting cable 10 and the vacuum tank 22 communicating to the gap are sealed in a vacuum state by a vacuum pump (not illustrated).

In the terminal connecting part 1, the cable core 11 of the superconducting cable 10 is supported at three portions of the conductor connecting part C1, the shield connecting part C2 and the cable connecting part C3.

In addition, positions (heights) of the conductor connecting part C1, the shield connecting part C2 and the cable connecting part C3 are adjusted such that the cable core 11 is supported straight in a horizontal state. Further, when intervals between the conductor connecting part C1, the shield connecting part C2 and the cable connecting part C3 to support the cable core 11 are too long, the cable core 11 deflects and the horizontal state is not kept. The amount of deflection needs to be 1 mm or less to keep the horizontal state. The Young's modulus of the superconducting cable is 5,000 kg/mm$^2$, and the support intervals of the cable core 11 change depending on the outer diameter of the conductor. For example, at 275 kV, the cable core outer diameter is 85 mm, and the support intervals are desirably 2800 mm or less to make the amount of deflection 1 mm or less. Meanwhile, at 66/77 kV, the outer diameter is 40 mm, and the support intervals are desirably 1500 mm or less to make the amount of deflection 1 mm or less.

Although the cable core 11 also expands and contracts in a height direction in cooling process or heating process upon assembly or maintenance, the amount of expansion and contraction in this case is about 5 mm and 8 mm or less at maximum, and movement of the horizontal state with the amount of deflection is less than 10 mm. When the deflection is 10 mm or less, movement of the cable core 11 in the longitudinal direction is not prevented at the positions of the conductor connecting part C1, the shield connecting part C2 and the cable connecting part C3. That is, the forces to start moving upon pulling and compression in the straight state and in a state where deflection is 10 mm are equal, and the force to start moving in a state where deflection is 10 mm or more gradually increases. Hence, deflection between the support intervals needs to be 1 mm or less.

Figure 3:
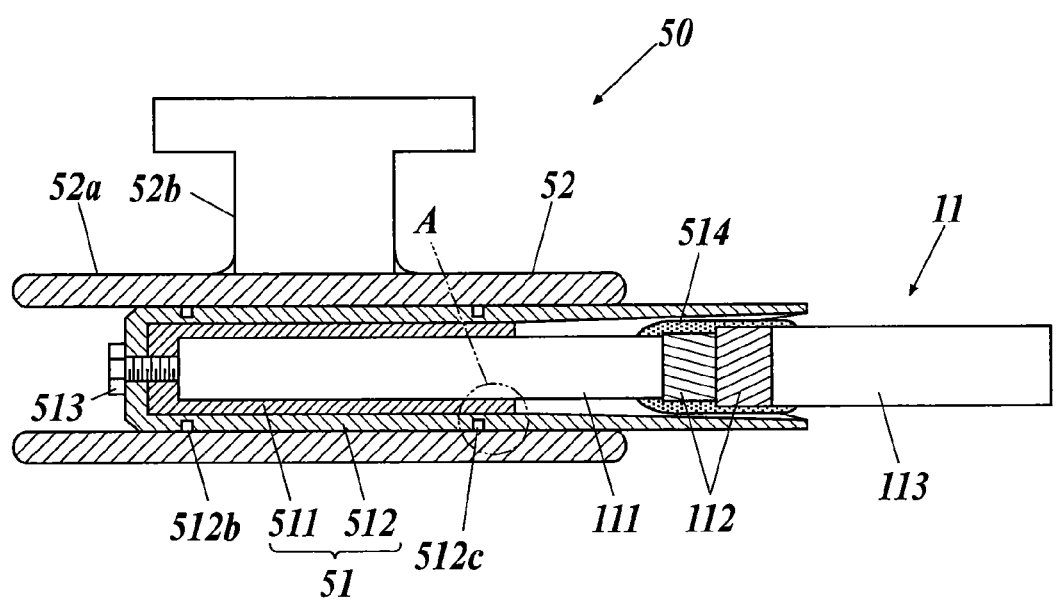
FIG. 3 is a view illustrating a specific configuration example of a conductor movable connecting terminal.

FIG. 3 is a view illustrating a specific configuration example of a conductor movable connecting terminal. As illustrated in FIG. 3, the conductor movable connecting terminal 50 has a conductor plug 51 attached to the outer periphery of the superconductive conductor layers 112 and a conductor socket 52 movably attached to the conductor plug 51.

The conductor socket 52 is, for example, a copper molding, and has a cylindrical part 52a and a connecting piece 52b formed in an outer periphery surface of the cylindrical part 52a The conductor plug 51 is movably attached to the cylindrical part 52a, and, for example, the conductor current lead 31 is connected to the connecting piece 52b.

For example, the conductor socket 52 is fastened to the conductor current lead 31 and the bushing 41 by fixing bolts, and the electrode shield 42 is fitted onto the outer periphery of the connecting site with, for example, the conductor current lead 31. In this case, by sliding the electrode shield 42 upward, and removing the fixing bolts and releasing the fixed states of the conductor current lead 31 and the bushing 41, the conductor socket 52 can slide in the horizontal direction. Consequently, it is possible to easily check the connected state of the conductor plug 51 and the conductor socket 52.

The conductor plug 51 has a compressing sleeve 511 attached to a front end part of the cable core 11 and an exterior covering body 512 to which the compressing sleeve 511 is inserted and fitted. The compressing sleeve 511 is, for example, a copper cylindrical member with a closed cover, and the inner diameter of the compressing sleeve 511 is designed substantially equal to (slightly larger than) the outer diameter of the former 111. Similar to the compressing sleeve 511, the exterior covering body 512 is, for example, a copper cylindrical member with a closed cover, and the inner diameter of the exterior covering body 512 is designed larger than the outer diameter of the compressing sleeve 511. Further, the outer diameter of the exterior covering body 512 is designed smaller than the inner diameter of the cylindrical part 52a of the conductor socket 52, and a slight clearance is formed when the conductor plug 51 is inserted through the conductor socket 52.

Figure 4A:
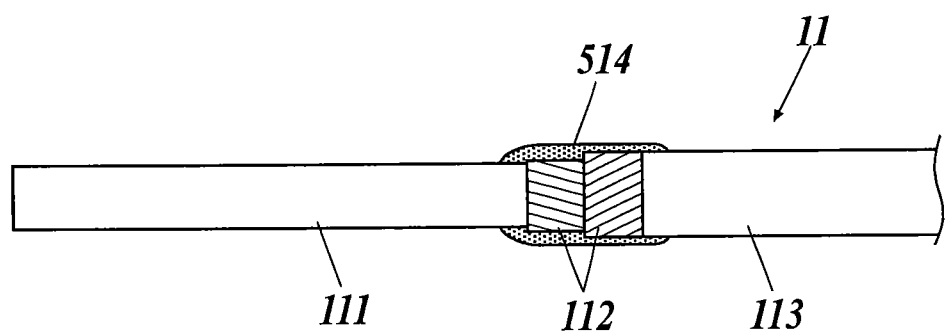
FIG. 4A is a view illustrating a first stage of a method of attaching a conductor plug.

Around the outer periphery of the superconductive conductor layers 112 exposed by stripping the cable core 11 stepwise, a copper braided wire 514 referred to as a "shield mesh" is wound including a boundary with the former 111 (see FIG. 4A). By saturating the copper braided wire 514 with solder, the superconductive conductor layers 112 and the copper braided wire 514 are electrically connected. When the superconductive conductor layers 112 adopt a laminated structure, the superconductive conductor layers 112 are cut stepwise such that the surface of each layer is exposed. FIG. 3 illustrates a double-layer structure of the superconductive conductor layers 112.

Figure 4B:
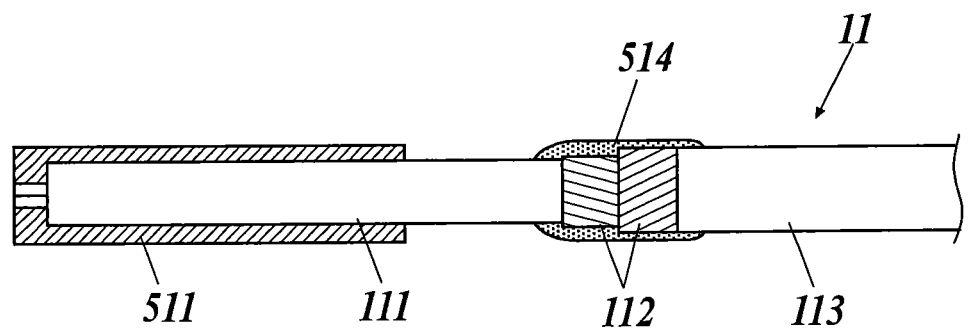
FIG. 4B is a view illustrating a second stage of a method of attaching the conductor plug.
Figure 4C:
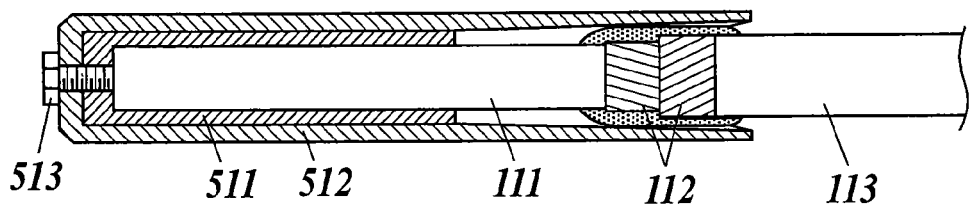
FIG. 4C is a view illustrating a third stage of the method of attaching the conductor plug.

After the copper braided wire 514 is wound, the front end part of the former 111 is inserted to the compressing sleeve 511 and is pressed to be fixed (see FIG. 4B). Further, when the compressing sleeve 511 is inserted and fitted to the exterior covering body 512 and is fixed, the conductor plug 51 is attached to the outer periphery of the superconductive conductor layer 112 (see FIG. 4C). By, for example, inserting a bolt 513 in a penetration hole formed on a front end surface of the exterior covering body 512 and fastening the bolt 513 to a female screw formed at the front end part of the compressing sleeve 511, the exterior covering body 512 is integrally attached to the cable core 11. Further, by exposing a terminal of the copper braided wire 514 and fastening the terminal to the exterior covering body 512, the exterior covering body 512 is electrically connected with the superconductive conductor layer 112.

In addition, by forming a solder injection hole at a position of the exterior covering body 512 meeting the superconductive conductor layers 112 and injecting solder from the solder injection hole, the exterior covering body 512 and the cable core 11 may be integrated and electrically connected. Further, by employing fastening using the bolt 513 and soldering in combination, the exterior covering body 512 and the cable core 11 may be fixed faster.

Figure 5:
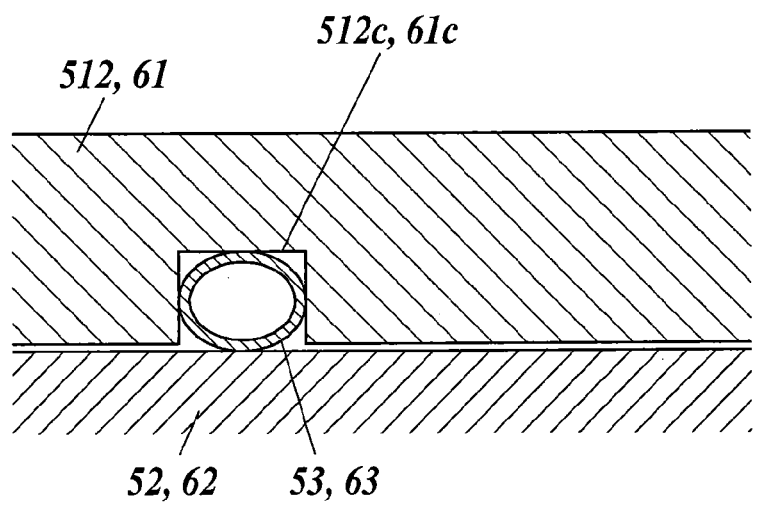
FIG. 5 is an enlarged cross-sectional view of a connecting part (a region A in FIG. 3) between a conductor plug and a conductor socket.

In the outer periphery surface of the conductor plug 51, that is, on the outer periphery surface of the exterior covering body 512, two concave grooves 512b and 512c spaced apart in the longitudinal direction are formed. The concave groove 512b is formed close to the front end side of the conductor plug 51, and the concave groove 512c is formed close to a base end side of the conductor plug 51. In the two inner concave grooves 512b and 512c, a conductive contacting terminal 53 is provided one by one (see FIG. 5). By arranging at least two contacting terminals 53 for the conductor plug 51, straightness of the conductor plug 51 and the conductor socket 52 is maintained and movement becomes smooth.

Figure 6A:
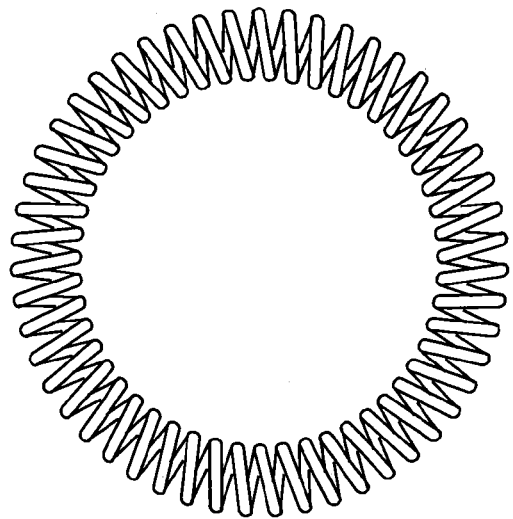
FIG. 6A is a plan view illustrating a coil spring which is an example of a contacting terminal.
Figure 6B:
FIG. 6B is a side view illustrating a coil spring which is an example of the contacting terminal.

The contacting terminal 53 is formed with a copper coil spring as illustrated in, for example, FIGS. 6A and 6B. Preferably, the coil spring may be a coil spring manufactured by GLOBETECH INC. The dimensions of the concave grooves 512b and 512c of the exterior covering body 512 and the contacting terminals 53 are determined such that, when the contacting terminals 53 are provided in the concave grooves 512b and 512c, the outer periphery parts of the contacting terminals 53 project from the outer periphery surface of the exterior covering body 512. That is, when the conductor plug 51 is inserted through the conductor socket 52, the contacting terminals 53 are interposed in the clearance between the conductor plug 51 and the conductor socket 52.

When the conductor plug 51 moves along the conductor socket 52 by interposing the contacting terminals 53 between the conductor plug 51 and the conductor socket 52, good conduction and connection are maintained at a low resistance (for example, several $\mu\Omega$). Further, the conductor plug 51 and the conductor socket 52 are connected by contraction forces of the coil springs, so that good conduction and connection are maintained even when misalignment occurs more or less.

In addition, an interval between the two inner concave grooves 512b and 512c formed in the exterior covering body 512 are desirably designed such that, when the conductor plug 51 moves along the conductor socket 52 following thermal expansion and contraction of the cable core 11, the contacting terminals 53 are not detached from the conductor socket 52. When the contacting terminals 53 detach from the conductor socket 52, good conduction and connection of the conductor plug 51 and the conductor socket 52 are blocked.

Thus, in the terminal connecting part 1, the conductor movable connecting terminal 50 is assembled by inserting the conductor plug 51, in a state being attached to the outer periphery of the superconductive conductor layer 112, in the conductor socket 52 connected to the conductor current lead 31. That is, the conductor movable connecting terminal 50 is realized by a simple configuration, so that it is possible to simplify the terminal connecting part 1.

Figure 7:
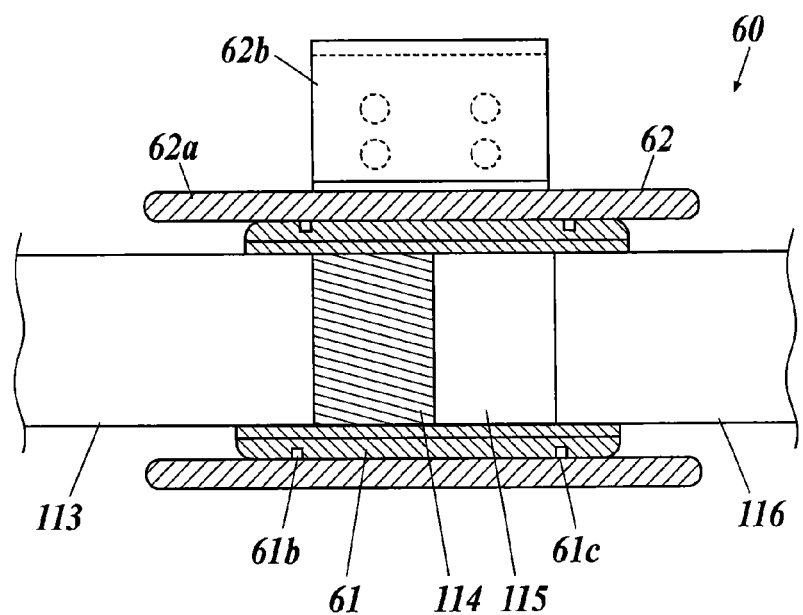
FIG. 7 is a view illustrating a specific configuration example of a shield movable connecting terminal.

FIG. 7 is a view illustrating a specific configuration example of a shield movable connecting terminal. A shield movable connecting terminal 60 employs substantially the same configuration as that of the conductor movable connecting terminal 50, and therefore will be briefly described. In FIG. 7, the same or corresponding components as those of the conductor movable connecting terminal 50 illustrated in FIG. 3 are designated by reference numerals of common lower digit numbers.

As illustrated in FIG. 7, the shield movable connecting terminal 60 is composed of a shield plug 61 attached to an outer periphery of the superconducting shield layers 114 and a shield socket 62 to which the shield plug 61 is movably attached.

The shield socket 62 is, for example, a copper molding, and has a cylindrical part 62a and a connecting piece 62b formed in an outer periphery surface of the cylindrical part 62a The shield plug 61 is movably attached to the cylindrical part 62a, and the shield current lead 32 is connected to the connecting piece 62b.

For example, the shield socket 62 is fastened to the shield current lead 32 by a fixing bolt. In this case, by detaching the fixing bolt and releasing a fixed state with the shield current lead 32, the shield socket 62 can slide in the horizontal direction. Consequently, it is possible to easily check the connected state between the shield plug 61 and the shield socket 62.

The shield plug 61 is a cylindrical compressing sleeve attached to the superconducting shield layers 114 of the cable core 11. Around the outer periphery of the superconducting shield layers 114 exposed by stripping the cable core 11 stepwise, a copper braided wire (not illustrated) referred to as a "shield mesh" is wound over the electric insulating layer 113 to the normal conducting shield layer 115. By saturating the copper braided wire with solder, the superconducting shield layers 114 and the copper braided wire are electrically connected.

After the copper braided wire (not illustrated) is wound around, the outer periphery part of the superconducting shield layers 114 is inserted and fitted to the shield plug 61, and is fixed. By, for example, injecting solder from a solder injection hole formed in the shield plug 61, the shield plug 61 and the cable core 11 are integrated and electrically connected.

In the outer periphery surface of the shield plug 61, two concave grooves 61b and 61c spaced apart in the longitudinal direction are formed. In the two concave grooves 61*b* and 61*c*, a conductive contacting terminal 63 is provided one by one, and at least two contacting terminals 63 are provided for the shield plug 61 (see FIG. 5).

The contacting terminals 63 are interposed between the shield plug 61 and the shield socket 62, so that, when the shield plug 61 moves along the shield socket 62, good conduction and connection are also maintained at a low resistance (for example, several $\mu\Omega$). Further, the shield plug 61 and the shield socket 62 are connected by contraction forces of the coil springs, so that good conduction and connection are maintained even when misalignment occurs more or less.

Thus, in the terminal connecting part 1, the shield movable connecting terminal 60 is assembled by inserting the shield plug 61 in a state being attached to the outer periphery of the superconducting shield layers 114 through the shield socket 62 connected to the shield current lead 32. That is, the shield movable connecting terminal 60 is realized by a simple configuration, so that it is possible to simplify the terminal connecting part 1.

Figure 8A:
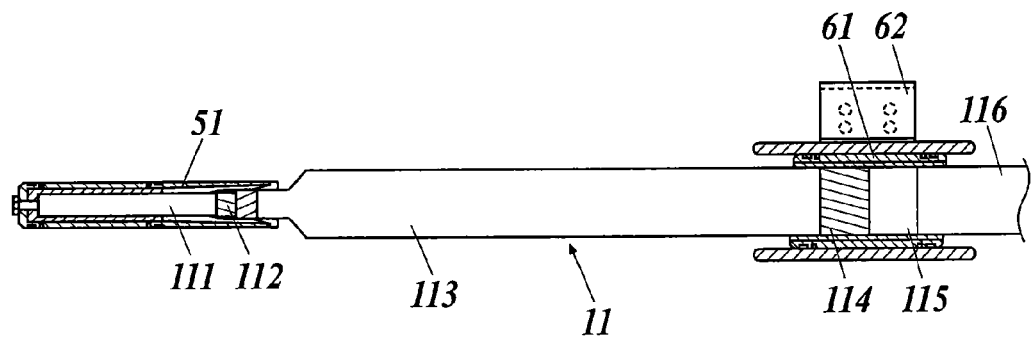
FIG. 8A is a view illustrating a first stage of a method of forming the terminal connecting part.
Figure 8B:
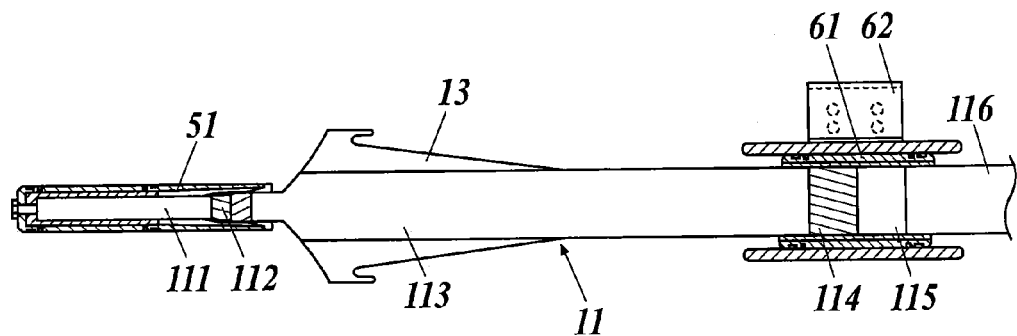
FIG. 8B is a view illustrating a second stage of the method of forming the terminal connecting part.
Figure 8C:
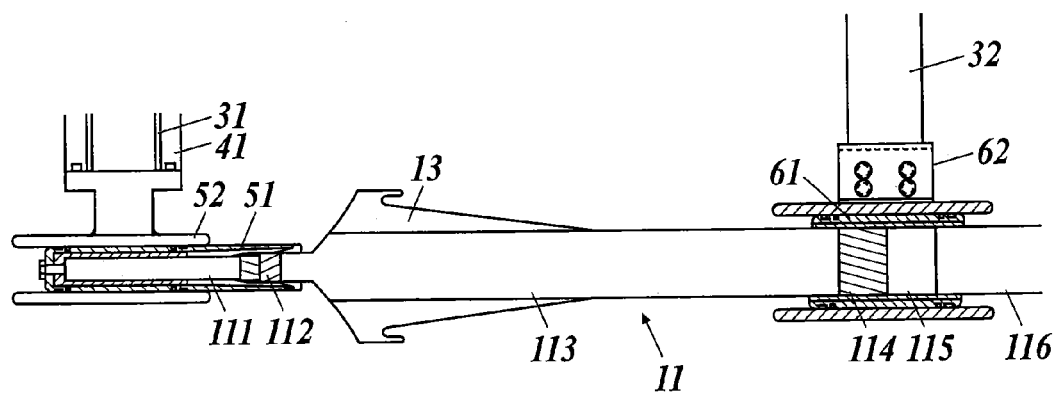
FIG. 8C is a view illustrating a third stage of the method of forming the terminal connecting part.

FIGS. 8A to 8C are views illustrating a method of forming the terminal connecting part 1. To form the terminal connecting part 1 at the terminal of the superconducting cable 10, first, as illustrated in FIG. 8A, the front end part of the superconducting cable 10 is stripped stepwise, and the shield plug 61 is attached to the superconducting shield layers 114 of the cable core 11. Further, the shield plug 61 is inserted and fitted to the shield socket 62. Furthermore, the conductor plug 51 is attached to the outer periphery of the superconductive conductor layers 112 of the cable core 11.

Next, as illustrated in FIG. 8B, in the outer periphery of the electric insulating layer 113 of the cable core 11 positioned between the conductor plug 51 and the shield plug 61, the electric field relaxing layer 13 formed with an epoxy bellmouth and a stress cone is formed. The conductor plug 51 may be attached after the electric field relaxing layer 13 is formed.

Meanwhile, in the low temperature container 20, the conductor socket 52 is connected to the conductor current lead 31 and the bushing 41 in advance.

Next, as illustrated in FIG. 8C, the cable core 11 to which the conductor plug 51, the shield plug 61, the shield socket 62 and the electric field relaxing layer 13 are assembled is put in the low temperature container 20 and the conductor plug 51 is inserted through the conductor socket 52.

The internal tube 121 of the superconducting cable 10 is connected to the outer wall of the cooling medium tank 21, and the external tube 122 is connected to the outer wall of the vacuum tank 22. The shield socket 62 is connected to the shield current lead 32 through a hand hole. Thus, the terminal connecting part 1 is formed at the terminal of the superconducting cable 10.

Similar to the shield socket 62, the cable core 11 may be put in the low temperature container 20 in a state where the conductor socket 52 is inserted through the conductor plug 51, and the conductor socket 52 may be connected to, for example, the conductor current lead 31 through a hand hole.

Thus, the terminal connecting part 1 has a low temperature container 20 filled with the cooling medium (for example, liquid nitrogen), the conductor current lead 31 which has one end immersed in the cooling medium and has the other end led to the normal temperature part, and a conductor movable connecting terminal 50 which electrically connects the superconductive conductor layers 112 and the conductor current lead 31.

Further, the superconductive conductor layers 112 of the superconducting cable 10 stripped stepwise from the front end are connected to the conductor current lead 31 through the conductor movable connecting terminal 50, and the cable core 11 of the superconducting cable 10 is movable in the longitudinal direction and is rotatable in the circumferential direction while maintaining electrical connection between the superconductive conductor layers 112 and the conductor current lead 31.

Furthermore, the terminal connecting part 1 has the shield current lead 32 which has one end immersed in the cooling medium and the other end led to the normal temperature part, and the shield movable connecting terminal 60 which electrically connects the superconducting shield layers 114 and the shield current lead 32.

Still further, the superconducting shield layers 114 of the superconducting cable 10 stripped stepwise are connected to the shield current lead 32 through the shield movable connecting terminal 60, and the cable core 11 of the superconducting cable 10 is movable in the longitudinal direction and is rotatable in the circumferential direction while also maintaining electrical connection between the superconducting shield layers 114 and the shield current lead 32.

Figure 9:
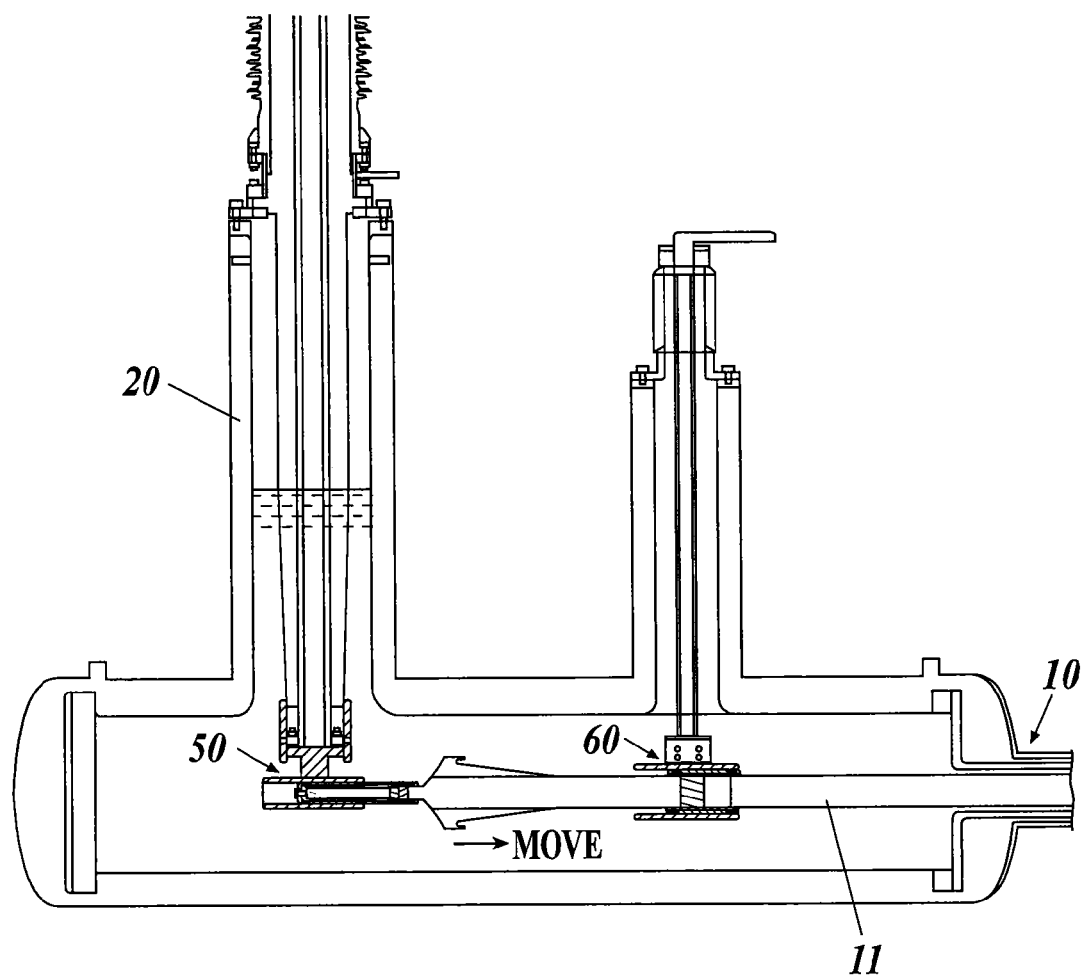
FIG. 9 is a view illustrating the terminal connecting part in cooling process.
Figure 10:
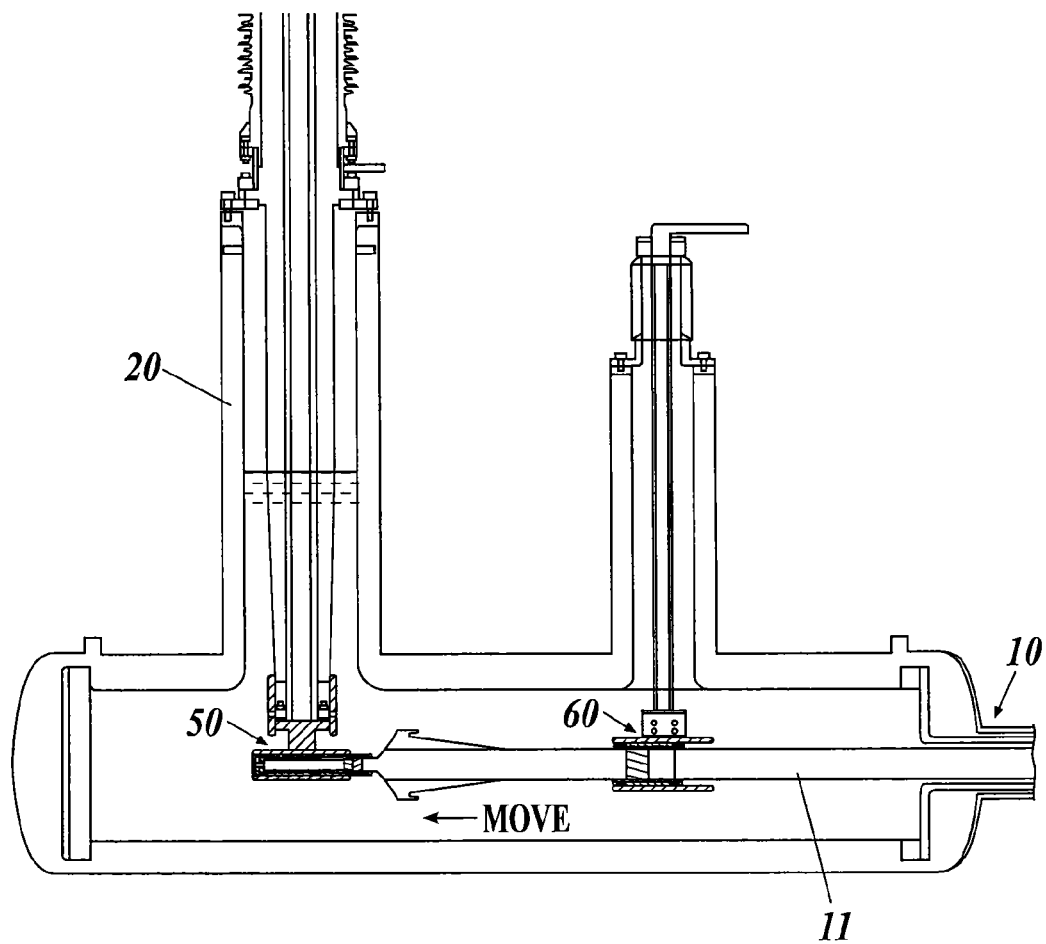
FIG. 10 is a view illustrating the terminal connecting part in heating process.

In the terminal connecting part 1, the cable core 11 is movable in the longitudinal direction, so that it is possible to effectively absorb thermal expansion and contraction of the cable core 11 occurring in cooling process or heating process upon assembly or maintenance. Although, for example, the cable core 11 thermally contracts in cooling process, the cable core 11 moves to the right following thermal contraction as illustrated in FIG. 9, so that the horizontal state (straight state) is held. Further, although the cable core 11 thermally expands in heating process, for example, the cable core 11 moves to the left side following thermal expansion in heating process as illustrated in FIG. 10, so that the horizontal state (straight state) is maintained.

Since the cable core 11 is rotatable in a circumferential direction, it is possible to absorb a twist to be applied to the cable core 11 due to a residual stress when the superconducting cable 10 is manufactured or installed. Consequently, a local stress does not concentrate by thermal expansion and contraction or a twist of the cable core 11 and the superconductive conductor layers 112 or the superconducting shield layers 114 do not buckle, so that it is possible to maintain integrity of the superconducting cable 10.

While a conventional technique actually produces an axial force of several tons upon thermal expansion and contraction of the cable core 11, the terminal connecting part 1 according to the embodiment can reduce the axial force to several hundred kg which is the one tenth.

Further, the cable core 11 and the conductor current lead 31 and the shield current lead 32 are connected using simple members such as the conductor movable connecting terminal 50 and the shield movable connecting terminal 60, so that it is possible to simplify and downsize the terminal connecting part.

That is, it is not necessary to provide in the low temperature container 20, for example, a supporting base for holding the horizontal state of the cable core 11 and to provide an offset to the cable core 11 in the terminal connecting part 1, so that it is possible to simplify and downsize the terminal connecting part 1.

The invention made by the inventors has been described hereinbefore specifically based on the embodiment. However, the invention is not limited to the above embodiment and may be modified in the scope that does not deviate from the gist of the invention.

Although, for example, the terminal connecting part 1 formed at the terminal of the single-core superconducting cable 10 has been described with the embodiment, the present invention is also applicable to the terminal connecting part formed at the terminal of the triple-core integrated superconducting cable in which a triple-core cable core is collectively housed in a thermal insulation tube.

Further, as superconducting wire materials forming the superconductive conductor layers 112 and the superconducting shield layers 114, tape wires in which filaments made of a Bi-based oxide superconductor are buried in a stabilizing material such as silver alloy may be applied.

Furthermore, when the cable core 11 of the superconducting cable 10 does not include the superconducting shield layers 114, the terminal connecting part 1 employs a configuration where only the superconductive conductor layers 112 and the conductor movable connecting terminal 50 are connected. In this case, naturally, the configuration of the low temperature container 20 is also changed.

Further, when the amount of thermal expansion and contraction of the cable core 11 is small, the superconducting shield layers 114 and the shield current lead 32 may be connected using a flexible connecting terminal such as a copper braided wire instead of the shield movable connecting terminal 60.

Furthermore, the contacting terminals 53 interposed between the conductor plug 51 and the conductor socket 52 and the contacting terminals 63 interposed between the shield plug 61 and the shield socket 62 may be formed using contacting terminals other than coil springs. That is, the contacting terminals 53 and the contacting terminals 63 only need to be contacting terminals which produce a low resistance and a little heat upon energizing. Therefore, contacting terminals which adopt structures which press copper terminals using springs or contacting terminals utilizing bearings such as spherical ball bearings or columnar roller bearings can be applied.

Further, although the two contacting terminals 53 are provided in the conductor plug 51 in the present embodiment, the contacting terminals 53 may be provided inside the conductor socket 52. Furthermore, three or more contacting terminals may be provided.

The same applies to the contacting terminals 63 provided between the shield plug 61 and the shield socket 62.

[Second Embodiment]

Next, a terminal connecting part 1A which is suitable for a current lead led to a normal temperature side using a movable terminal will be described as a second embodiment. In addition, the same or corresponding configurations of the terminal connecting part 1A as those of the terminal connecting part 1 described above will be assigned the same reference numerals and will not be described.

Figure 11:
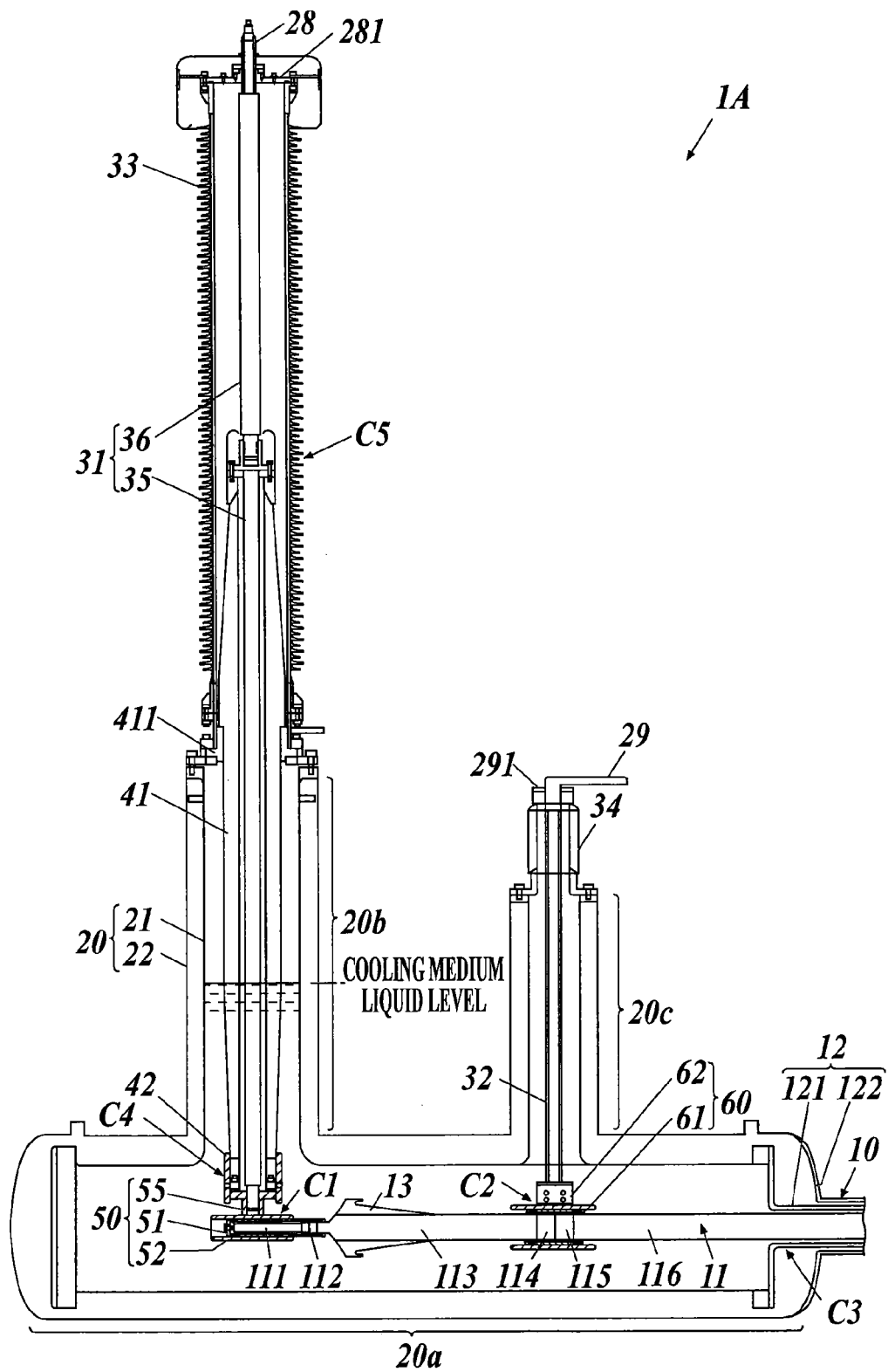
FIG. 11 is a view illustrating a schematic configuration of a terminal connecting part of a superconducting cable according to a second embodiment.

As illustrated in FIG. 11, the terminal connecting part 1A also employs a configuration where an end of a superconducting cable 10 is housed in a low temperature container 20 in a predetermined state, and a current is led toward a practical system side through a conductor current lead 31A and a shield current lead 32.

A lead part 20b is vertically provided above a housing part 20a in a vertical direction, a cylindrical insulator 33 concentric to the lead part 20b is provided to continue to an upper part of the lead part 20b, and a panel 281 which holds an upper metal fitting 28 connected to the practical system side is attached to an upper end of the insulator 33. Further, inside and at the center position of the lead part 20b and the insulator 33, a conductor current lead 31 which connects the upper metal fitting 28 from a conductor movable connecting terminal 50 is provided, and the conductor current lead 31 is supported inside through a bushing (condenser cone) 41 which is an insulating tubular body. Furthermore, the bushing 41 separates inner regions of the lead part 20b and the insulator 33 by means of a flange part 411 for attachment fixed to the outer periphery thereof, and blocks a flow of a liquid or gas.

The inner region of the insulator 33 is filled with a liquid insulator such as an insulating oil or $SF_6$ gas. In addition, the liquid insulator in the insulator 33 has a normal temperature, and the insulator 33 belongs to the normal temperature part.

Further, the inner region of the lead part 20b is filled with a liquid cooling medium (more specifically, liquid nitrogen) up to a predetermined height, and a gaseous cooling medium (more specifically, gaseous nitrogen) is sealed in a region above the liquid level.

The lead part 20c has a cylindrical shape of a diameter which is slightly smaller than that of the lead part 20b, and is vertically provided above the housing part 20a in the vertical direction and adjacent to the lead part 20b.

Further, the terminal connecting part 1A has, at an upper part of the conductor socket 52 of the conductor movable connecting terminal 50, a connecting piece 55 for connecting with a lower lead 35 of the conductor current lead 31.

Figure 12:
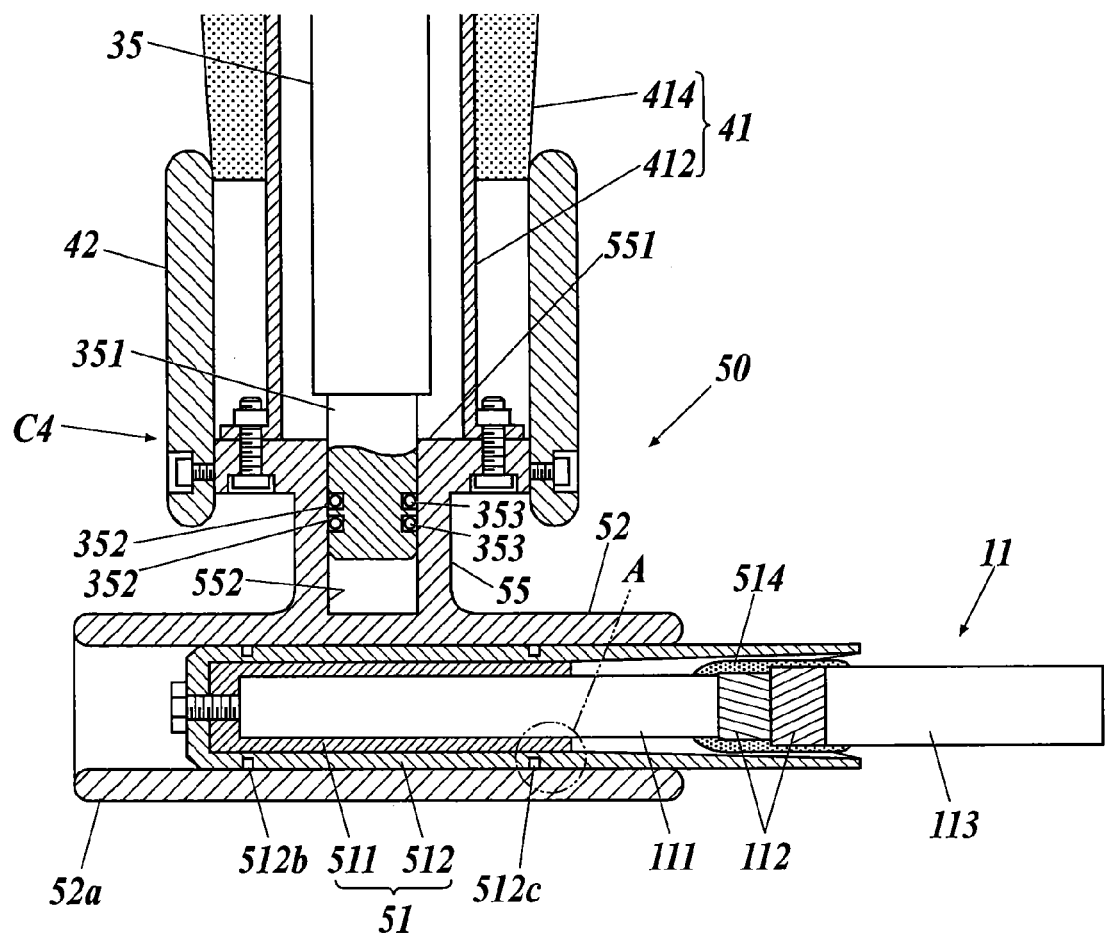
FIG. 12 is a view illustrating a specific configuration example of a conductor movable connecting terminal and a coupling part of the conductor movable connecting terminal and a conductor current lead.

As illustrated in FIG. 12, the connecting piece 55 is a cylindrical body with a closed bottom which is integrally formed with the conductor socket 52 and is upright from the upper part of the conductor socket 52 upward in the vertical direction. This connecting piece 55 has a circular disk-shaped flange part 551 at the upper end thereof, and has a circular opening part 552 in the center. Further, the connecting piece 55 is fixed and mounted by way of screwing in a state where a lower part of an electrode shield 42 having the cylindrical sleeve shape described above surrounds the flange part 551. Furthermore, in the upper surface of the flange part 551, a lower end of a hollow tube 412 of the bushing 41 is fixed by way of bolting.

Still further, in a center opening part 552 of the connecting piece 55, the lower end of the conductor current lead 31 (more precisely, a diameter-reduced part 351 of a lower lead 35 described below) is inserted, and the conductor movable connecting terminal 50 and the conductor current lead 31 are electrically connected.

In addition, the lower lead 35 of the conductor current lead 31 is supported to suspend at the upper end thereof, and the lower end is not inserted to the depthmost part of the center opening part 552 as illustrated in FIG. 12. By this means, the lower lead 35 still has a room to vertically move with respect to the connecting piece 55.

The conductor current lead 31 is vertically divided into the lower lead 35 and an upper lead 36, and they are coaxially coupled by a coupling part. Further, the lower lead 35 and the upper lead 36 of the conductor current lead 31 are both good conductors as a whole such as solid or hollow round bar bodies made of copper.

As illustrated in FIG. 12, the diameter-reduced part 351 in which a peripheral part of a lower end surface is chamfered is formed at a lower end of the lower lead 35, and the outer diameter thereof is set smaller than the inner diameter of the opening part 552 formed in the connecting piece 55 of the above conductor movable connecting terminal 50 so as to be insertable to the opening part 552. Further, the inner diameter of the diameter-reduced part 351 is set smaller than that of the opening part 552 to allow the diameter-reduced part 351 and the opening part 552 to slide with respect to each other, and allow the lower lead 35 to move in the up and down directions with respect to the conductor movable connecting terminal 50 according to an insertion length of the diameter-reduced part 351. Simultaneously, the lower lead 35 is allowed to turn about the diameter-reduced part 351 with respect to the opening part 552.

In the outer periphery surface of the diameter-reduced part 351, two concave grooves 352 spaced apart in the insertion direction are formed close to each other, and two conductive contacting terminals 353 are provided in the lower and upper concave grooves 352 (see FIG. 12).

The contacting terminal 353 is formed using the above-described copper coil spring illustrated in FIGS. 6A and 6B, and is set to a size such that the contacting terminal 353 projects outside to some degree from the outer periphery surface of the diameter-reduced part 351 when provided on the concave grooves 352. By interposing the two contacting terminals 353 between the diameter-reduced part 351 and the opening part 552, tangling due to distortion of leads is relaxed and, even when the lower lead 35 moves in the up and down directions, good conduction and connection are maintained at a low resistance (for example, several µΩ) by contraction forces of the coil springs.

The diameter-reduced part 351 of the lower lead 35 and the opening part 552 of the connecting piece 55 form a coupling part C4 which can slidably couple the lower lead 35 and the conductor movable connecting terminal 50 along the longitudinal direction of the conductor current lead 31.

Figure 13:
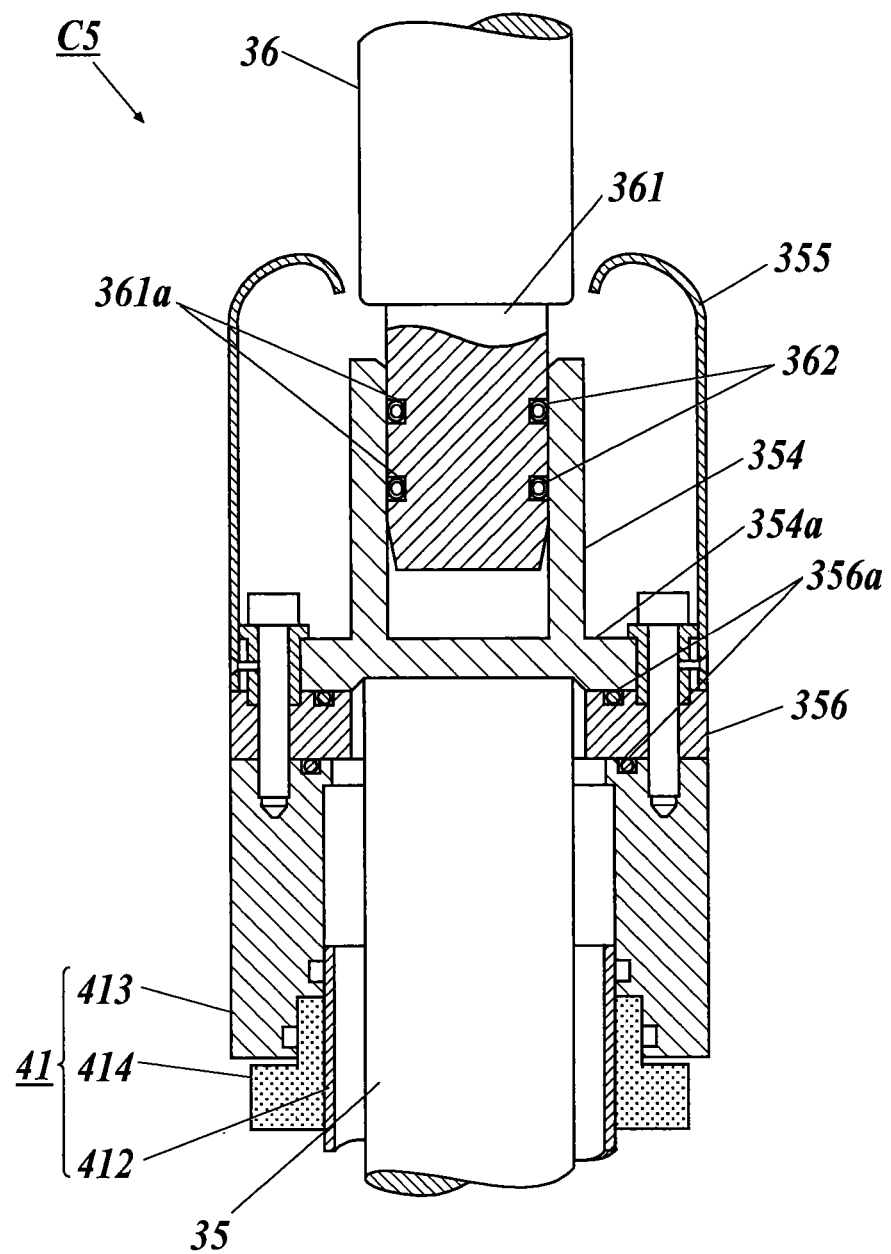
FIG. 13 is a view illustrating a specific configuration example of a coupling part of an upper lead and a lower lead of the conductor current lead.

FIG. 13 is a cross-sectional view illustrating a coupling part C5 of the lower lead 35 and the upper lead 36 from a cross section along the vertical up and down directions.

As illustrated in FIG. 13, at an upper end of the lower lead 35, a socket part 354 in which a diameter-reduced part 361 of the upper lead 36 described below can be inserted is integrally formed. This socket part 354 is formed in a cylindrical shape with a closed bottom and an opened top, and a circular flange part 354a is extended from a lower part of the outer periphery thereof toward an outside in the radius direction. The shield 355 is mounted on the outer periphery part of the flange part 354a by way of screwing, and a collar 413 provided at the upper end of the bushing 41 is coupled to the lower surface side of the flange part 354a through an insulating ring 356. The bolts used for the coupling are insulated from the lower lead 35 by the insulating ring 356, and a current does not flow from the lower lead 35 to the bushing 41.

Further, O rings 356a and 356a are inserted between the lower surface of the flange part 354a and the upper surface of the insulating ring 356 and between the lower surface of the insulating ring 356 and the upper end surface of the collar 413 of the bushing 41 to keep airtightness and water-tightness to prevent circulation of gaseous and liquid cooling media in the lead part 20b and the liquid insulator in the insulator 33.

In the insulator 33 and the lead part 20b, the flange part 354a is set on the upper end surface of the collar 413 of the bushing 41 and the lower lead 35 is supported to hang down through the bushing 41.

The upper end of the upper lead 36 is held by the upper metal fitting 28 positioned at an upper end of the insulator 33, and the upper lead 36 is supported to hang down inside the insulator 33.

As illustrated in FIG. 13, a diameter-reduced part 361 in which a periphery part of the lower end surface is chamfered is formed at the lower end of the upper lead 36, and the outer diameter thereof is set slightly smaller than the inner diameter of the opening part formed at the center of the upper surface of the socket part 354 of the lower lead 35 and can be inserted to the socket part 354. The inner diameter of the diameter-reduced part 361 is set slightly smaller than the socket part 354 to allow the diameter-reduced part 361 and the socket part 354 to slide with respect to each other, and allow the lower lead 35 to move in the up and down directions with respect to the upper lead 36 according to an insertion length of the diameter-reduced part 361.

In the outer periphery surface of the diameter-reduced part 361, two concave grooves 361a spaced apart in the insertion direction are formed close to each other, and conductive contacting terminals 362 are provided in the respective concave grooves 361a.

The contacting terminal 362 adopts the same structure as the above-described copper coil spring illustrated in FIGS. 6A and 6B, and is set to a size such that the contacting terminal 362 projects outside to some degree from the outer periphery surface of the diameter-reduced part 361 when the contacting terminal 362 is provided in the concave grooves 361a. Therefore, even when the lower lead 35 moved in the up and down directions, good conduction and connection are maintained for the upper lead 36 at a low resistance (for example, several µΩ) by the contraction forces of the coil springs.

The diameter-reduced part 361 of the upper lead 36 and the socket part 354 of the lower lead 35 form the coupling part C5 which slidably couple the lower lead 35 and the upper lead 36 along the longitudinal direction of the conductor current lead 31.

Figure 14:
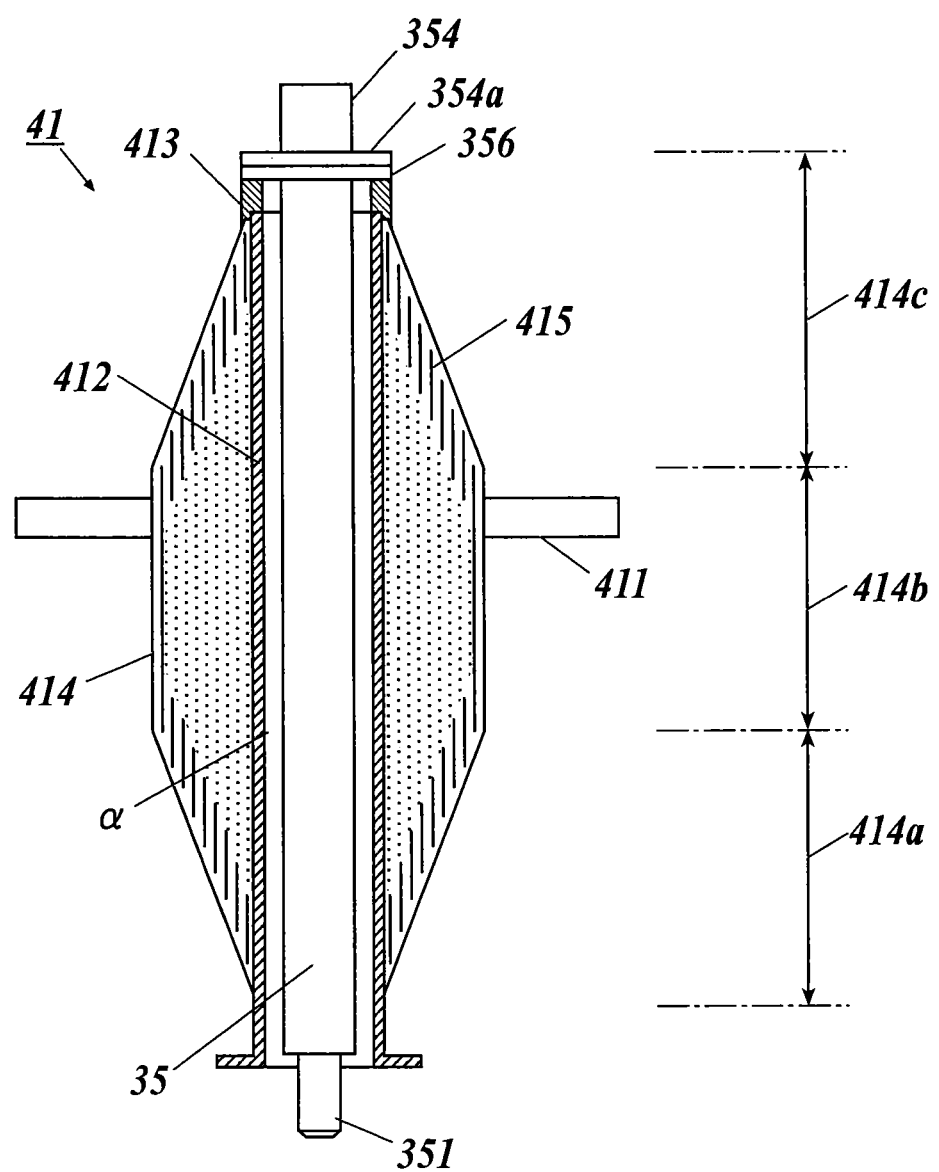
FIG. 14 is an explanatory view schematically illustrating a cross-sectional structure of a bushing.

FIG. 14 is an explanatory view schematically illustrating a cross-sectional structure of the bushing 41. A structure of the bushing 41 will be described with reference to FIGS. 11 to 14.

The bushing 41 has a cylindrical collar 413 attached to a lower side of the flange part 354a of the socket part 354 and a stainless steel hollow tube 412 which movably inserts the lower lead 35 to the center position while forming a gap α.

The upper end of the hollow tube 412 is coupled to the lower part of the collar 413, and the lower end is fixed to the upper surface of the flange part 551 of the conductor movable connecting terminal 50. Although the lower end of the hollow tube 412 conducts with the conductor movable connecting terminal 50, the insulating ring 356 which is a member made of an insulator is inserted between the collar 413 and the socket part 354 and the upper end is not conducted. By this means, unlike a case that both of the lower end and the upper end of the hollow tube 412 are conducted with the conductor current lead 31, it is possible to prevent heat generation due to an induction current in the hollow tube 412.

Further, a bushing insulator 414 made of an insulating material is formed on the outer periphery surface of the hollow tube 412. This bushing insulator 414 is formed with a lower part 414a, an intermediate part 414b and an upper part 414c in the vertical direction, and the intermediate part 414b has a uniform outer diameter in the vertical direction, the lower part 414a and the upper part 414c have diameters which are reduced downward or upward and the bushing insulator 414 is formed in a virtually spindle shape as a whole.

Further, in the lower part 414a and the upper part 414c of the bushing insulator 414, metal foils 415 for forming a capacitor electrode of a certain width in the vertical direction are buried in the insulator 414 stepwise and concentrically at certain intervals in the radius direction about the hollow tube 412. Furthermore, the metal foils 415 which form an outermost layer are formed over the entire region of the intermediate part 414b of the bushing insulator 414, and an earth wire which is not illustrated is attached to the metal foils 415 of the outermost layer and is earthed.

In the outer periphery surface of the intermediate part 414b of the bushing insulator 414, a flange part 411 extended outside the radius direction about the intermediate part 414b is fixed and mounted by way of bonding. The flange part 411 is held by being sandwiched between the upper end surface of the lead part 20*b* and the lower end surface of the insulator 33. That is, the bushing 41 is fixed by being set on the upper end surface of the lead part 20*b* Further, O rings which are not illustrated are inserted between the lower surface of the flange part 411 and the upper end surface of the lead part 20*b,* and between the upper surface of the flange part 411 and the lower end surface of the insulator 33, and keep airtightness and water-tightness to prevent circulation of gaseous and liquid cooling media in the lead part 20*b* and the liquid insulator in the insulator 33.

For the bushing insulator 414, for example, epoxy resin, EPR (Ethylene-Propylene Rubber), rubber or FRP (Fiber Reinforced Plastics) is used. Further, the metal foil 415 is formed using, for example, an aluminum foil.

According to the structure, capacitors of each metal foil 415 having an equal capacity are connected in series from a high voltage side (closer side from the lower lead 35) to a low voltage side (farther side from the lower lead 35) in the bushing insulator 414, so that electric fields along the interface of the bushing insulator 414 are adjusted substantially uniform. Further, the metal foils 415 of the outermost layer of the bushing insulator 414 are earthed, so that a surface electric field of the intermediate part 414*b* of the bushing insulator 414 which has the uniform outer diameter can be employed as an earth potential.

According to the structure, the bushing 41 can minimize the earth potential at the intermediate part 414*b* in the bushing insulator 414. Hence, the length of the intermediate part 414*b* is set and the height to set the bushing 41 is adjusted such that a containment region (an upper region in the lead part 20*b*) of a gaseous cooling medium which decreases withstand voltage characteristics to the lowest, in the region in which the overall length of conductor current lead 31 is housed, is included in the range of the intermediate part 414*b* in the bushing insulator 414. When the height of the bushing 41 is adjusted, a margin is desirably secured to some degree taking into account influences of thermal expansion and contraction of the conductor current lead 31 and the bushing 41 and fluctuation of the height of the liquid level of the cooling medium.

In addition, the flange part 411 provided to the intermediate part 414*b* of the bushing insulator 414 needs to isolate the interior of the insulator 33 from the interior of the lead part 20*b*, and therefore is fixed to the surface of the bushing insulator 414 by, for example, an adhesive for maintaining airtightness and water-tightness.

Further, as long as the hollow tube 412 can support a cone structure, the hollow tube 412 does not necessarily need to be made of a conductive material, and may be made of an insulator such as resin like FRP.

Thus, the terminal connecting part 1A provides the same effect as that of the above-described terminal connecting part 1, and can provide the following effect.

That is, since the terminal connecting part 1A adopts a structure of dividing the conductor current lead 31 into the lower lead 35 and the upper lead 36 and fitting the diameter-reduced part 361 of the upper lead 36 that forms the coupling part of the lower lead 35 and the upper lead 36, and the socket part 354 of the lower lead 35, the lower lead 35 can slide in the vertical up and down directions.

Further, by virtue of the structure of fitting the diameter-reduced part 351 of the lower lead 35 that forms the coupling part of the lower lead 35 and the conductor movable connecting terminal 50 and the opening part 552 of the connecting piece 55, the lower lead 35 can slide in the vertical up and down directions.

Furthermore, the lower lead 35 is supported to hang down by the bushing 41 and a predetermined gap $\alpha$ is provided between the outer periphery surface of the lower lead 35 and the inner periphery surface of the hollow tube 412 of the bushing 41.

According to the above configuration, when thermal expansion and contraction occurs in the conductor current lead 31 in cooling process or heating processing upon assembly or maintenance, the lower lead 35 can absorb thermal expansion and contraction of the bushing 41 in the vertical direction by means of the coupling part with the upper lead 36 and the coupling part with the conductor movable connecting terminal 50, and can effectively avoid occurrence of a stress between members and resulting damages.

Further, if thermal expansion and contraction occurs only in the conductor current lead 31, the coupling part which is allowed to slide only needs to be provided only in one of the upper side or the lower side of the lower lead 35. However, the lower lead 35 of the conductor current lead 31 is actually supported by the bushing 41, and therefore positional fluctuation of the lower lead 35 due to thermal expansion and contraction of the bushing 41 needs to be absorbed. The terminal connecting part 1 is provided with the coupling parts C4 and C5 which enable upward and downward sliding in the vertical direction of the lower lead 35, so that thermal expansion and contraction of the bushing 41 can be absorbed by the upper coupling part C5 (the coupling part of the lower lead 35 and the upper lead 36) and thermal expansion and contraction of the lower lead 35 can be absorbed by the lower coupling part C4 (the coupling part of the lower lead 35 and the conductor movable connecting terminal 50). Further, thermal expansion and contraction occurring in the upper lead 36 can be absorbed by the upper coupling part C5 (the coupling part of the lower lead 35 and the upper lead 36).

Thus, while adopting a structure of providing a gap between the bushing 41 and the lower lead 35 for preventing the bushing 41 and the lower lead 35 from being peeled or damaged, the terminal connecting part 1A can effectively absorb both of thermal expansion and contraction of the bushing 41 and thermal expansion and contraction of the lower lead 35 resulting from the structure by means of the two coupling parts C4 and C5, and effectively prevent occurrence of a stress between members due to thermal expansion and contraction and resulting damages on the members even in cooling process or heating process upon assembly or maintenance.

Further, the terminal connecting part 1 absorbs thermal expansion and contraction occurring in the longitudinal direction of the conductor current lead 31 by means of the upper and lower coupling parts C4 and C5 in the lower lead 35 and absorbs thermal expansion and contraction in the longitudinal direction of the cable core 11 by means of the conductor movable connecting terminal 50 and the shield movable connecting terminal 60, so that, even when thermal expansion and contraction simultaneously occur in two directions of the longitudinal direction of the conductor current lead 31 and the longitudinal direction of the cable core 11, it is possible to individually absorb the thermal expansion and contraction and effectively cancel the influence.

Furthermore, the upper and lower coupling parts C4 and C5 of the lower lead 35 adopt a structure of absorbing thermal expansion and contraction by way of sliding instead of a structure of allowing thermal expansion and contraction depending on flexibility of a member, so that, even when a cross-sectional region of leads is expanded to increase the amount of current to be applied to the conductor current lead 31, it is possible to secure effective absorption of thermal expansion and contraction at all times without influencing absorbing capacity of thermal expansion and contraction.

In addition, although a case has been described as an example where the contacting terminals 353 and 362 are provided in the diameter-reduced part 351 of the lower lead 35 and the diameter-reduced part 361 of the upper lead 36 in the terminal connecting part 1A, the number of contacting terminals is by no means limited to the number described above as an example, and may be increased or decreased. Further, although a case has been described as an example where the contacting terminals 353 and 362 are provided in the diameter-reduced parts 351 and 361, grooves may be provided in an inner periphery surface of an opening in which the diameter-reduced parts 351 and 361 are inserted, and the contacting terminals 353 and 362 may be provided inside the grooves.

The first and second embodiments disclosed herein are exemplary in all respects and should not be regarded as restrictive. The scope of the invention is indicated by the appended claims rather than by the foregoing description. All modifications that fall within the meaning and range of equivalency of the claims are to be embraced within the scope of the invention.

Further, movable contacting terminals which enable the shield current lead 32 to vertically slide may also be used for the shield current lead 32.

The present application claims priority to Japanese patent applications Ser. No. 2011-014656 filed on Jan. 27, 2011 and No. 2011-014657 filed on Jan. 27, 2011 the contents of which including specification, claims, drawings and summary are incorporated herein by reference in its entirety.

Industrial Applicability

The present invention provides industrial applicability in the field of a terminal connecting part which connects to a current lead at a normal temperature from a superconducting cable which is kept at a very low temperature to transmit power.

REFERENCE SIGNS LIST 1 terminal connecting part
10 superconducting cable
11 cable core
111 former
112 superconductive conductor layer
113 electric insulating layer
114 superconducting shield layer
115 normal conducting shield layer
116 protecting layer
12 thermal insulation tube
121 internal tube
122 external tube
123 multilayer thermal insulator
124 corrosion-resistant layer
13 electric field relaxing layer
20 low temperature container
20a housing unit
20b lead part
20c lead part
21 cooling medium tank
22 vacuum tank
31 conductor current lead
32 shield current lead
35 lower lead
353 contacting terminal
356 insulating ring (insulator)
36 upper lead
362 contacting terminal
41 bushing (capacitor cone, insulating tubular body)
42 electrode shield
50 conductor movable connecting terminal
51 conductor plug
511 compressing sleeve
512 exterior covering body
513 bolt
514 copper braided wire
52 conductor socket
52a cylindrical part
52b connecting piece
53, 63, 353, 362 contacting terminal
60 shield movable connecting terminal
61 shield plug
62 shield socket
62a cylindrical part
62b connecting piece
C1 conductor connecting part
C2 shield connecting part
C3 cable connecting part
C4 lower coupling part
C5 upper coupling part

The invention claimed is:

1. A terminal connecting part of a superconducting cable in which a cable core comprising a former and a superconductive conductor layer is housed in a thermal insulation tube, the terminal connecting part comprising:
a low temperature container which is filled with a cooling medium;
a conductor current lead, one end of the current lead is immersed in the cooling medium and an other end is led to a normal temperature part; and
a conductor movable connecting terminal which electrically connects the superconductive conductor layer and the conductor current lead, wherein
the superconductive conductor layer is connected to the conductor current lead through the conductor movable connecting terminal,
the cable core is movable in a longitudinal direction and is rotatable in a circumferential direction while maintaining electrical connection between the superconductive conductor layer and the conductor current lead,
the conductor movable connecting terminal is connected to the conductor current lead provided to hang down from above the low temperature container, and
the cable core is supported by a connecting part with the conductor movable connecting terminal and a connecting part between the thermal insulation tube and the low temperature container.

2. The terminal connecting part of the superconducting cable according to claim 1, wherein
the conductor movable connecting terminal is composed of a conductor plug which is attached to an outer periphery of the superconductive conductor layer and a conductor socket to which the conductor plug is movably attached,
the conductor plug is inserted, in a state being attached to the outer periphery of the superconductive conductor layer, in the conductor socket connected to the conductor current lead, and
at least two conductive contacting terminals are interposed between the conductor plug and the conductor socket.

3. The terminal connecting part of the superconducting cable according to claim 1, wherein;
the cable core comprises a superconducting shield layer, a normal conducting shield layer and a shield movable connecting terminal which electrically connects the superconducting shield layer and the shield current lead, the terminal connecting part comprises a shield current lead, one end of the shield current lead is immersed in the cooling medium and an other end is led to a normal temperature part, and wherein;

the superconducting shield layer is connected to the shield current lead through the shield movable connecting terminal, the cable core is movable in the longitudinal direction and is rotatable in the circumferential direction while also maintaining electrical connection between the superconducting shield layer and the shield current lead, the shield movable connecting terminal is connected to the shield current lead provided to hang down from above the low temperature container, and the cable core is supported by a connecting part with the conductor movable connecting terminal, a connecting part with the shield movable connecting terminal and a connecting part between the thermal insulation tube and the low temperature container.

4. The terminal connecting part of the superconducting cable according to claim 3, wherein the shield movable connecting terminal is composed of a shield plug which is attached to an outer periphery of the superconducting shield layer and a shield socket to which the shield plug is movably attached, the shield plug is inserted, in a state being attached to the outer periphery of the superconducting shield layer, in the shield socket connected to the shield current lead, and at least two conductive contacting terminals are interposed between the shield plug and the shield socket.

5. The terminal connecting part of the superconducting cable according to any one of claims 1 to 4, wherein levelness of the cable core is maintained at 1 mm or less.

6. The terminal connecting part of the superconducting cable according to claim 1 or 3, wherein the conductor current lead comprises an upper lead and a lower lead which are vertically coupled, the low temperature container supports the lower lead to vertically hang down through an insulating tubular body which surrounds the lower lead with a gap around the lower lead, and a coupling part between the upper lead and the lower lead is slidable with respect to each other along a longitudinal direction of the conductor current lead while maintaining an electrically connected state and a coupling part between the lower lead and the conductor movable connecting terminal are slidable with respect to each other along a longitudinal direction of the conductor current lead while maintaining an electrically connected state.

7. The terminal connecting part of the superconducting cable according to claim 6, wherein each of the coupling part between the upper lead and the lower lead and the coupling part between the lower lead and the conductor movable connecting terminal adopts a structure in which at least two conductive contacting terminals are interposed, and which allows a turn about a center line along the longitudinal direction of the conductor current lead.

8. The terminal connecting part of the superconducting cable according to claim 2, 4 or 7, wherein the conductive contacting terminals are formed with coil springs.

* * * * *